Dec. 30, 1947.  A. R. WARNER  2,433,585
GAUGING DEVICE
Filed Aug. 1, 1944  3 Sheets-Sheet 1

INVENTOR
Arthur R. Warner
BY
ATTORNEY

Dec. 30, 1947.   A. R. WARNER   2,433,585
GAUGING DEVICE
Filed Aug. 1, 1944   3 Sheets-Sheet 2
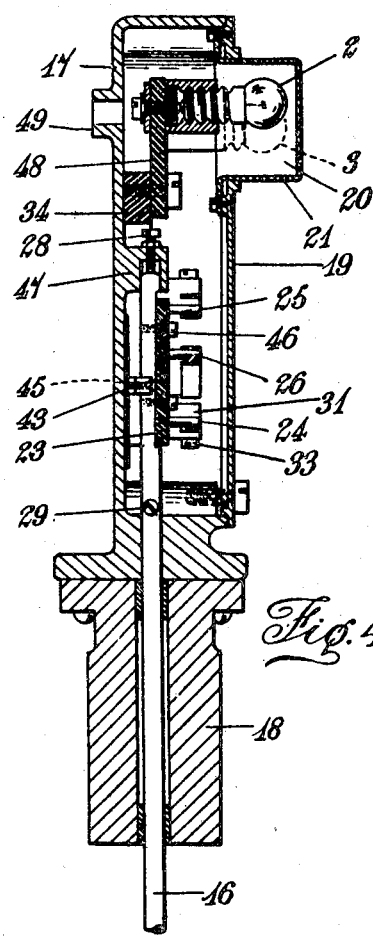
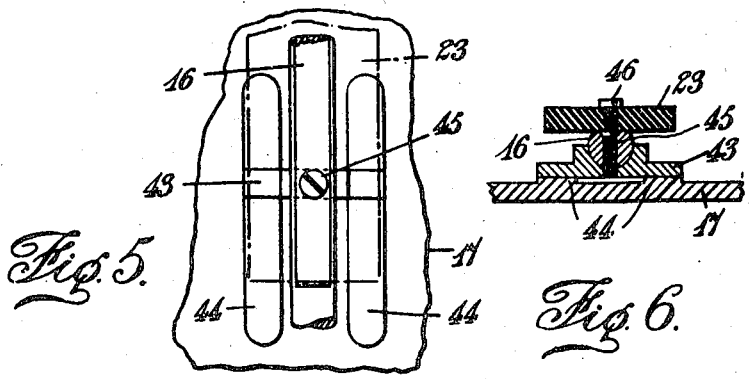
INVENTOR
Arthur R. Warner
BY
ATTORNEY Dec. 30, 1947.  A. R. WARNER  2,433,585
GAUGING DEVICE
Filed Aug. 1, 1944  3 Sheets-Sheet 3

INVENTOR
Arthur R. Warner
BY
ATTORNEY

Patented Dec. 30, 1947

2,433,585

UNITED STATES PATENT OFFICE 2,433,585

GAUGING DEVICE

Arthur Richard Warner, Walton-on-Thames, England

Application August 1, 1944, Serial No. 547,648
In Great Britain July 1, 1943

Section 1, Public Law 690, August 8, 1946
Patent expires July 1, 1963

5 Claims. (Cl. 177—311)

This invention relates to improvements in gauging devices and more particularly to devices in which one of three electric lamps is illuminated to check mass-produced parts or articles to predetermined limits.

These lamps are adapted to give a clear and unmistakable indication however close the limits to which a part is being checked. This is in contrast to the more usual devices in which a pointer is moved over a graduated scale on which adjustable "tolerance marks" are set at the points corresponding to the minus and plus limits respectively. When the tolerance is small, these marks lie very close together and the attention of the operator is taxed, and his judgment liable to err, in telling whether the pointer has come to rest just within or outside the zone of tolerance lying between the two marks. The lamps of the electrical indicator on the other hand, always give the same clear and unmistakable indication, quite irrespective of whether the tolerance lies between close or wide limits.

The object of the present invention is to provide an electrical indicator in which:

(a) There is no multiplication of movement in the moving parts, thereby greatly simplifying the construction and eliminating the errors and mechanical wear arising from such multiplication of movement.

(b) Sparking or arcing is virtually eliminated across the gaps between the switch contacts, which gaps are exceedingly small owing to the absence of multiplication of movement in the moving parts.

(c) Simple means are provided to achieve a positive change-over from one lamp to another during the movement of the measuring spindle before this comes to rest, so that in the final checking position taken up by the spindle, one lamp, and one only, will always light up.

(d) To provide simple means for setting the plus and minus limits.

A still further object is to provide an indicator using a low voltage supply for the lamps and a lamp circuit in which use is made of an external resistance and of the fact that the resistance of the lamp filament in the cold state, as when current is commencing to flow, is relatively low.

With the above and other objects in view the invention consists in providing in a gauging device of the type in which one of three electric lamps is illuminated to check parts or articles to predetermined limits a circuit in which all three lamps are in series with a low voltage supply and a resistance in shunt with the lamp which indicates that the article is within the predetermined limits, the arrangement being such that in use one lamp and one only will always light up.

The invention further consists in providing a lamp circuit for a gauging device comprising a switch in shunt with each lamp indicating above and below the predetermined limits, a switch in series with the lamps and a low voltage supply of current, a resistance in shunt with the lamp indicating that the article is within the predetermined limits and means on a movable member to operate the switches whereby any one of the three lamps will be illuminated according to the movement of the movable member.

The invention still further consists in providing means whereby the maximum and minimum limits of the gauging device may be varied by adjustment of the switches.

The invention will now be described with reference to the accompanying drawings in which:

Figure 4 is a vertical section thereof drawn to a slightly larger scale;

Figure 5 is a detail showing one form of means for preventing rotation of the operating spindle;

Figure 6 is a cross section thereof;

Figure 1:
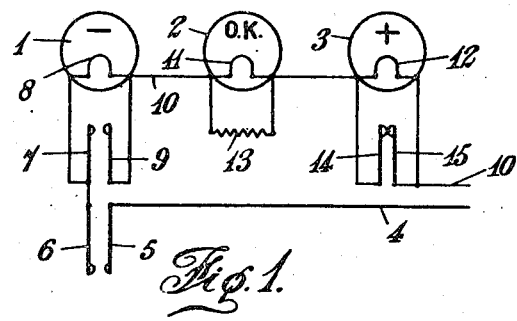
Figure 1 is a circuit diagram for the electrical indicator.
Figure 2:
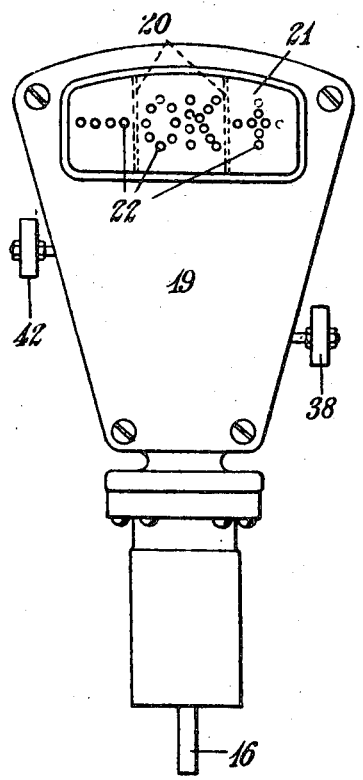
Figure 2 is a front elevation of one constructional form of indicator device.
Figure 3:
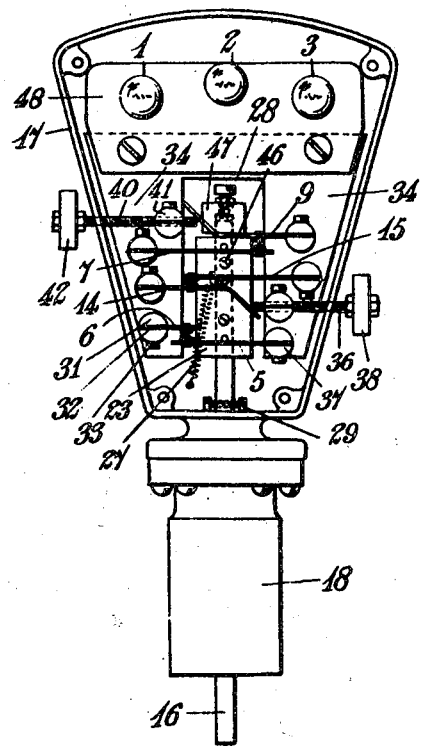
Figure 3 is a similar view with the front cover removed.
Figure 7:
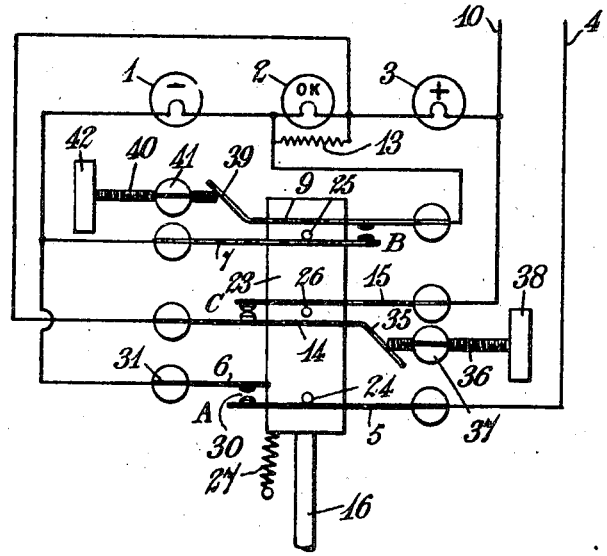
Figure 7 is a diagram showing the switches, lamps and wiring of the device, the parts being in their normal positions
Figure 8:
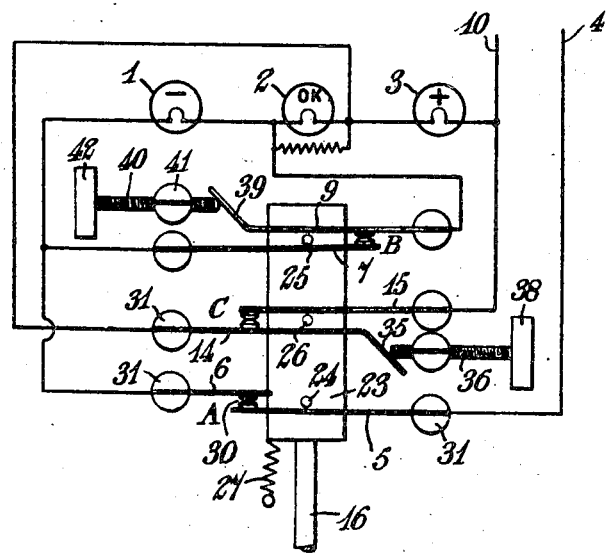
Figure 8 is a similar view with the parts in a position to give an "O. K." indication.

Referring to the drawings and more particularly to Figures 1, 7 and 8 the circuit employed for lighting the three lamps 1, 2 and 3 to indicate "minus," "O. K." or "plus" respectively comprises a supply lead 4 to one arm 5 of a switch which for convenience of description is indicated as A. The other arm 6 of this switch A is connected to the arm 7 of another switch B and to one terminal of the filament 8 of the minus lamp 1. The other arm 9 of this switch B is connected to the other terminal and to the other or return supply lead 10 through the filaments 11 and 12 of the other lamps 2 and 3 in series. The "O. K." lamp filament 11 is shunted by a resistance 13 and the "plus" lamp filament 12 is shunted by a switch C which is in its closed position when the parts of the indicator are in their normal position. This switch C comprises leaves 14 and 15 carrying contacts as in the case of the other switches. The value of the resistance 13 is low enough to ensure that when the "minus" lamp 1 or the "plus" lamp 3 is connected to the supply through the "O. K." lamp 2 shunted by the resistance 13, the "O. K." lamp 2 will not glow but high enough not to pass too heavy a current when connected to the supply as when all the contact switches A, B and C are closed. In the normal position when the device is out of use and the indicator spindle or plunger 16 to be hereinafter described is in its lowest position all the lamps are off. When an undersized part is being checked the spindle 16 of the indicator is so moved that the switch A is closed to light up the minus lamp 1. When an "O. K." part is being checked all the switches are closed and the "O. K." lamp 2 lights up. When an oversized part is checked the switches A and B are closed and the switch C is open to light up the "plus" lamp 3.

According to one constructional form of this invention as shown more particularly in Figures 2 to 6, the indicator comprises a box-like casing 17 of substantially triangular shape having an extension 18 at its apex in which is slidably mounted with the minimum of side play the indicator spindle or plunger 16 to gauge the work in the usual manner. The casing 17 provides a housing for the switches A, B and C and for the three lamp bulbs 1, 2 and 3 and the resistance 13. This casing 17 is fitted with a detachable cover 19 having three compartments to isolate the lamps 1, 2 and 3. These compartments are conveniently formed by partitions 20 in an arcuate shaped box-like extension 21 of the cover 19 and provided with windows preferably of a distinctive colour. These windows are conveniently marked "minus," "O. K." and "plus," respectively such as by perforations 22 in the extension 21 of the metal cover 19. The central "O. K." window is preferably coloured green, the plus window amber and the minus window red. The extension 18 of the casing 17 which is of cylindrical shape is adapted to be clamped in a rigging fixed to a table so that work placed on the table can be checked by the upward movement of the spindle or plunger 16. Obviously, the indicator device is so designed that it may be mounted in other positions. The upper end of the spindle or plunger 16 which projects into the casing 17 carries an insulated block 23 fitted with three pins 24, 25 and 26 to actuate leaf springs of switches A, B and C respectively. The spindle or plunger 16 is adapted to be moved against the action of a spring 27 and suitable upper and lower stops 28 and 29 are provided. Each switch comprises a pair of leaf springs as previously described. These leaf springs are provided with co-operating contacts 30 of silver, iridio platinum or other suitable material which obviously must be kept clean and free from foreign matter. The supply voltage is kept as low as possible owing to the minute gaps between open contacts. 3.5 volts has been found satisfactory and may be obtained either from a dry battery or a small step-down transformer. Each leaf spring is rigidly held at one end conveniently in an upright post 31. Thus three leaf spring holding posts 31 are provided at each side of the sliding block 23 carried by the spindle 16. The posts 31 are conveniently slotted at 32 to receive the leaf springs which are held by transversely mounted adjusting and locking screws 33. The posts are mounted on insulating bases or an insulating base 34 secured in the casing 17 and connected by leads to the lamps and resistance as previously described. In normal position the lower switch A is maintained out of contact by the lower pin 24 on the block 23 carried by the spindle 16. This lower pin 24 is arranged to contact with the upper surface of the resilient leaf 6 of the switch A so that its contact thereon is spaced from the contact carried by the opposite post. The intermediate switch C which is normally in contact comprises the two resilient leaves 14 and 15 which extend across the casing 17. The upper leaf 15 carrying its contact at its outer end is adapted to be moved out of contact by the second pin 26 on the block, the pin acting on the lower surface of the said leaf 15. The other leaf 14 of this switch which has its contact adjacent to its carrying post 31 has its outer and free end bent to an angle as shown at 35 so as to be engaged by an adjusting screw 36. This adjusting screw 36 is threaded in a further post 37 and its outer end projects through the casing 17 where it is provided with a manipulating head 38 whereby the spring 14 may be deflected to vary the plus limit. The upper switch B is of similar construction to the intermediate switch but oppositely arranged so that the upper and third pin 25 is arranged to normally contact with the upper surface of the lower leaf 7. In this case the free end of the upper leaf 9 is bent to an angle 39 to be engaged by an adjusting screw 40 carried by a further post 41. The outer end of this screw 40 projects through an aperture in the opposite side of the casing 17 and is fitted with a manipulating head 42 to vary the minus limit of this switch. The heads 38 and 42 of these adjusting screws 36 and 40 may be calibrated or provided with any suitable means to visually indicate their adjustment. It will be seen that simple means are provided for setting the plus and minus limits enabling a small movement of the adjustable contact to be effected by a relatively large movement of the manipulating head. The principle employed is that the deflection at any point of a leaf spring, rigidly held at one end, when a deflecting force is applied at the free end, is proportional to the square of the distance from the fixed end. Means are provided to prevent rotation of the spindle 16 and the sliding block 23 carried thereby. These means are shown more particularly in Figures 5 and 6 and comprise a slider 43 slidably mounted on elongated embossments 44 formed on the base of the casing 17. This slider 43 is secured to the upper portion of the spindle 16 by means of a screw 45 and the block 23 carrying the pins 24 to 26 is secured to a flat formed on the said portion of the spindle 16 by screws 46. The upper end of the spindle 16 may also be suitably guided in an embossment 47 formed on the base of the casing 17 and carrying the upper stop 28. The resistance 13 is preferably arranged under an insulating plate 48 carrying the sockets for the lamps 1, 2 and 3 and the various parts of the device are wired up in the manner described to a pair of supply terminals or sockets 49 provided on the back of the casing 17.

The casing may be of any convenient shape. For instance the casing may be of rectangular shape and the lamp may be arranged vertically and fitted in tubular extensions on the wall of the casing. Further the switch adjusting screws may be arranged to project from one side of the casing.

In a further modified construction the leaf springs of the switches may be arranged vertically in a suitable casing and the pins may be arranged to act on inclined or bent portions of the leaves.

In operation it will be seen that when the indicator is mounted in any usual or convenient manner for checking work pieces a light will appear in one of the three windows, to indicate whether the work is within the predetermined tolerance. The rejects can be sorted into those above the plus limit and those below the minus limit. The operation of the device will be readily understood from the previous description. The movement of the spindle or plunger is transmitted direct to the leaf springs without multiplication. It will be noticed that the change over from the minus to the "O. K." lamp is effected in a very simple manner by closing a pair of contacts while the change over from the "O. K." to the plus light is effected by opening another pair.

Obviously the device may be modified to operate a remote indicator panel or to give audible and/or visual readings or signals. Further a number of devices may be provided to check a number of dimensions on a component simultaneously.

What I claim is:

1. A gauging indicator including three electric signals successively and respectively indicating minus, permissibly correct and plus as to articles being gauged, a circuit for energizing the signals in series, a resistance in shunt with the permissibly correct signal, means for controlling said circuit and selectively shunting said plus and minus signals, and a member movably responsive to gauge characteristics of the articles being gauged for operating said means to control circuiting conditions of the respective signals in accordance with member gauging movement.

2. A gauge indicator comprising three electric signals respectively indicating minus, permissibly correct and plus as to articles being gauged, a circuit for energizing the signals in series, a master control for said circuit, a resistance in said circuit in parallel with said permissibly correct signal and in series with said plus and minus signals, means for shunting said plus and minus signals respectively, and a member movably responsive to gauge characteristics of the article being gauged for operating said master control and said means to control circuiting conditions of the respective signals in accordance with member gauging movement.

3. A gauge indicator comprising three electric signals respectively indicating minus, permissibly correct and plus as to articles being gauged, a circuit for energizing the signals in series, a resistance in shunt with the permissibly correct signal, a member movably responsive to gauge characteristics of the article being gauged, and switches to be operated in gauging movement of the member to control circuiting conditions of the respective signals in accordance with member movement, said switches being arranged with said circuit so that they are all closed when the permissibly correct signal is energized.

4. A gauge indicator comprising three electric signals respectively indicating minus, permissibly correct and plus as to articles being gauged, a circuit for energizing the signals in series, a resistance in shunt with the permissibly correct signal, a member movably responsive to gauge characteristics of the article being gauged, and switches to be operated in gauging movement of the member to control circuiting conditions of the respective signals in accordance with member movement, said member being provided with pins which are operable in the movement of the member to control the switches.

5. A gauge indicator comprising three electric signals respectively indicating minus, permissibly correct and plus as to articles being gauged, a circuit for energizing the signals in series, a resistance in shunt with the permissibly correct signal, a member movably responsive to gauge characteristics of the article being gauged, and switches to be operated in gauging movement of the member to control circuiting conditions of the respective signals in accordance with member movement, one of said switches each being in shunt with the plus signal and the minus signal respectively and one of said switches being in series with all of said signals.

ARTHUR RICHARD WARNER.

REFERENCES CITED

The following references are of record in the file of this patent:

UNITED STATES PATENTS

| Number | Name | Date |
|---|---|---|
| 1,680,690 | Murphy | Aug. 14, 1928 |
| 1,968,866 | Ames | Aug. 7, 1934 |
| 2,047,408 | Emery et al. | July 14, 1936 |
| 2,238,071 | Nazar | Apr. 15, 1941 |

FOREIGN PATENTS

| Number | Country | Date |
|---|---|---|
| 555,364 | Great Britain | Aug. 19, 1943 |

OTHER REFERENCES

Electrotechnisch Zeitschrift Heft 29/30, July 29, 1943, p. 400.

Aircraft Engineering, page 121, Fig. 6. April 1943. Copy in Div. 42.